(12) United States Patent

Puig

(10) Patent No.: US 12,561,552 B1
(45) Date of Patent: Feb. 24, 2026

(54) INTEGRATED CIRCUIT TO IMPLEMENT SPIKING NEURAL NETWORK

(71) Applicant: Tomás Puig, San Francisco, CA (US)

(72) Inventor: Tomás Puig, San Francisco, CA (US)

( * ) Notice: Subject to any disclaimer, the term of this patent is extended or adjusted under 35 U.S.C. 154(b) by 0 days.

(21) Appl. No.: 19/019,273

(22) Filed: Jan. 13, 2025

(51) Int. Cl.
        *G06N 3/049*        (2023.01)
        *G06N 3/082*        (2023.01)

(52) U.S. Cl.
        CPC ............. *G06N 3/049* (2013.01); *G06N 3/082* (2013.01)

(58) Field of Classification Search
        CPC ................................ G06N 3/049; G06N 3/082
        USPC ......................................................... 706/15
        See application file for complete search history.

(56)                References Cited

U.S. PATENT DOCUMENTS

| | | | | |
|---|---|---|---|---|
| 2014/0052679 A1* | 2/2014 | Sinyavskiy | .............. | G06N 3/10 |
| | | | | 706/44 |
| 2014/0071135 A1* | 3/2014 | Morsi | ................... | G06T 11/206 |
| | | | | 345/440 |
| 2018/0075345 A1* | 3/2018 | Gottfried | .............. | G06N 3/049 |
| 2022/0374702 A1* | 11/2022 | Kushmerick | ........ | G06N 3/0464 |

OTHER PUBLICATIONS

Lee et al., "Structure Level Adaptation for Artificial Neural Networks", Springer Scientific + Business Media, 1991 (Year: 1991).*

Kasabov, N. "Evolving spiking neural networks and neurogenetic systems for spatio- and spectro-temporal data modeling and pattern recognition." *Evolutionary Intelligence* 1.3 (2008): 115-129.

Fusi, S., Drew, P.J., Abbott, L.F. "Cascade models of synaptically stored memories." *Neuron* 45.4 (2005): 599-611.

Chistiakova, M., Bannon, N.M., Bazhenov, M., Volgushev, M. "Heterosynaptic Plasticity: Multiple Mechanisms and Multiple Roles." *The Neuroscientist* 20.5 (2014): 483-498.

Arthur, D., Vassilvitskii, S. "K-means++: The advantages of careful seeding." *Proceedings of the eighteenth annual ACM-SIAM symposium on Discrete algorithms*. Society for Industrial and Applied Mathematics, 2007.

Bäßler, D., Kortus, T., & Gühring, G. (2022). "Unsupervised Anomaly Detection in Multivariate Time Series with Online Evolving Spiking Neural Networks." *Machine Learning* 111(4): 1377-1408.

Wang, J., Belatreche, A., Mcguire, LP., & McGinnity, TM. "Spike Temp: An Enhanced Rank-Order-Based Learning Approach for Spiking Neural Networks with Adaptive Structure." *IEEE Trans. Neural Networks and Learning Systems*, Jan. 2017;28(1): 30-43, 30-43.

(Continued)

*Primary Examiner* — Tsu-Chang Lee

(57)                ABSTRACT

An integrated circuit and associated methods are disclosed for implementing a spiking neural network (SNN) through a Temporal Causal Entanglement Graph (TCEG). In one embodiment, the TCEG includes a plurality of nodes, each of which is associated with node attributes, and a plurality of edges, each of which is associated with edge attributes. Each node in the TCEG is connected to at least one other node by one or more edges, where each edge denotes a causal entanglement between a first node and a second node. By integrating normalizing-flow neurons at the node level and employing transfer entropy (or functionally equivalent measures) along the edges, the system facilitates dynamic learning, adaptation, and real-time causal inference within the spiking neural network.

25 Claims, 11 Drawing Sheets

Spike Neural Network
100

(56)        References Cited

OTHER PUBLICATIONS

Song, S., Miller, K. D., & Abbott, L. F. (2000). "Competitive Hebbian Learning Through Spike-Timing-Dependent Synaptic Plasticity." *Nature Neuroscience* 3(9): 919-926.

Bi, G. Q., & Poo, M. M. (1998). "Synaptic Modifications in Cultured Hippocampal Neurons: Dependence on Spike Timing, Synaptic Strength, and Postsynaptic Cell Type." *Journal of Neuroscience* 18(24): 10464-10472.

Spinney, R. E., Prokopenko, M., & Lizier, J. T. (2016). Transfer entropy in continuous time, with applications to jump and neural spiking processes. *ArXiv.* https://doi.org/10.1103/PhysRevE.95.032319.

Butz, M., Wörgötter, F., & van Ooyen, A. (2009). "Activity-dependent structural plasticity." *Brain Research Reviews* 60(2): 287-305.

Schultz, W. (1998). "Predictive reward signal of dopamine neurons." *Journal of Neurophysiology* 80(1): 1-27.

Rossi, E., et al. "Temporal Graph Networks for Deep Learning on Dynamic Graphs." *arXiv preprint ar Xiv:2006.10637* (2020).

Welford, B. P. (1962). "Note on a Method for Calculating Corrected Sums of Squares and Products." *Technometrics* 4(3): 419-420.

Schreiber, T. "Measuring information transfer." *Physical Review Letters 85.2* (2000): 461.

* cited by examiner

Node Pair 200

Node Attributes 240
- Neuron ID 241
- Spatial Coordinates 242
- Temporal Information 243
- State Variables 244

Edge Attributes 250
- TE Values 251
- Optimal Lag 252
- P-value 253
- Temporal Validity 254

Method
400

401 Data Ingestion

402 Data Loading

403 Data Transformation

404 Dataset Creation

405 DataLoader Preparation

406 Model Initialization

407 Forward Pass (First Phase)

408 Graph Updates

409 Second Pass Processing

410 Casual Graph Building

411 Model Outputs

FIGURE 6A

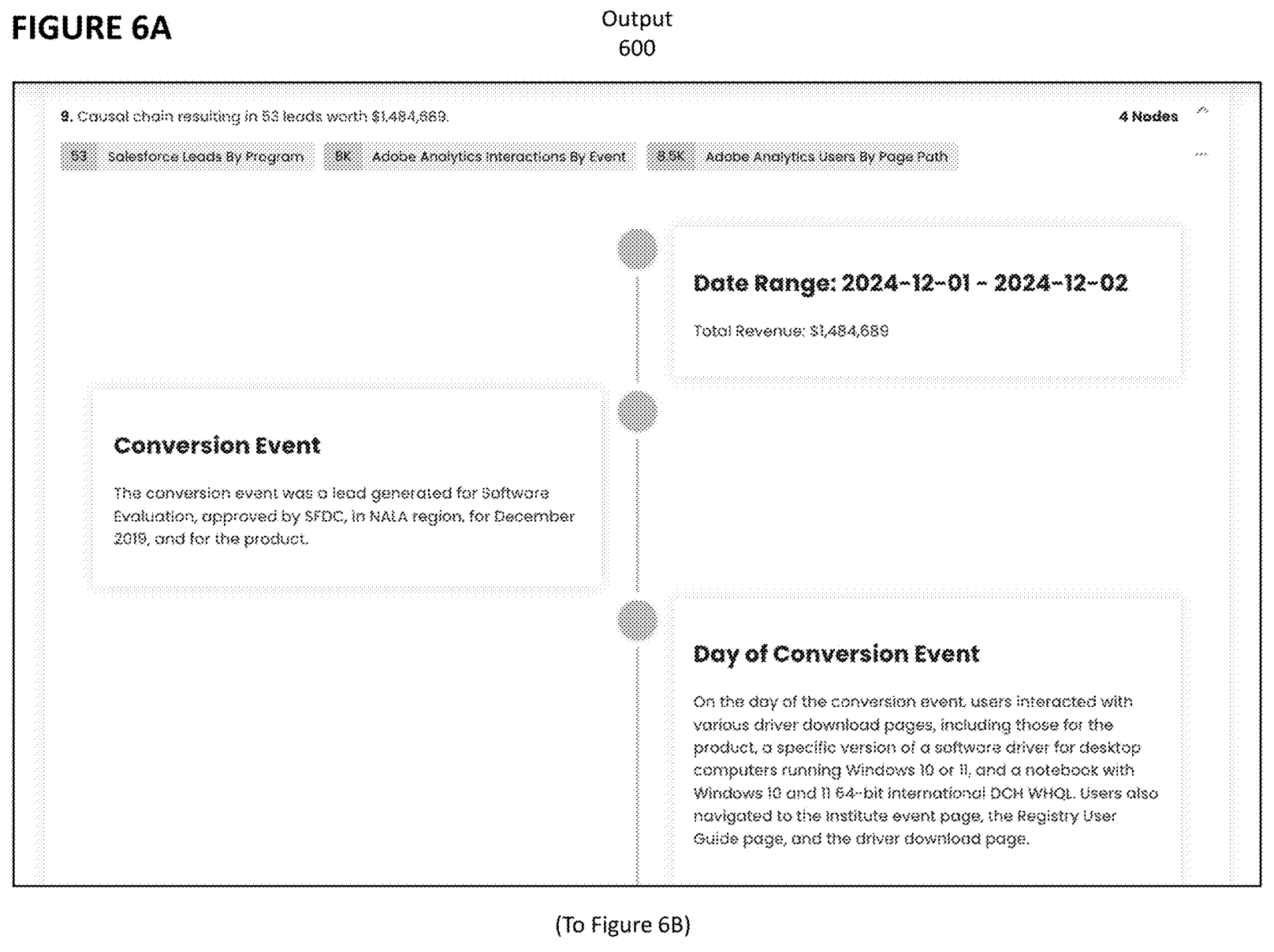

Output
600

9. Causal chain resulting in 53 leads worth $1,484,669.

| 53 | Salesforce Leads By Program | 8K | Adobe Analytics Interactions By Event | 3.5K | Adobe Analytics Users By Page Path |

Date Range: 2024-12-01 ~ 2024-12-02

Total Revenue: $1,484,689

Conversion Event

The conversion event was a lead generated for Software Evaluation, approved by SFDC, in NALA region, for December 2019, and for the product.

Day of Conversion Event

On the day of the conversion event, users interacted with various driver download pages, including those for the product, a specific version of a software driver for desktop computers running Windows 10 or 11, and a notebook with Windows 10 and 11 64-bit international DCH WHQL. Users also navigated to the Institute event page, the Registry User Guide page, and the driver download page.

4 Nodes (To Figure 6B)

FIGURE 6B

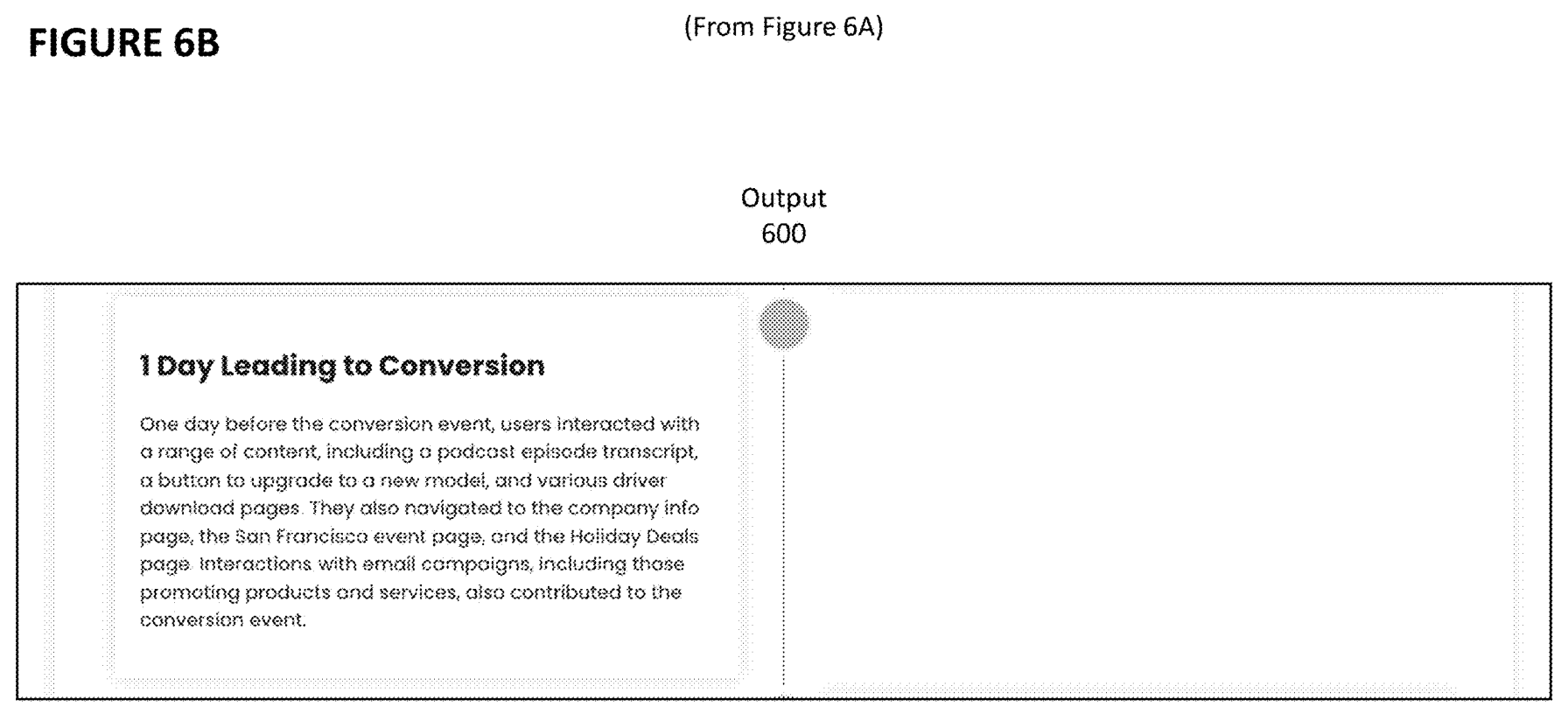

(From Figure 6A)

Output
600

1 Day Leading to Conversion

One day before the conversion event, users interacted with a range of content, including a podcast episode transcript, a button to upgrade to a new model, and various driver download pages. They also navigated to the company info page, the San Francisco event page, and the Holiday Deals page. Interactions with email campaigns, including those promoting products and services, also contributed to the conversion event.

FIGURE 7A

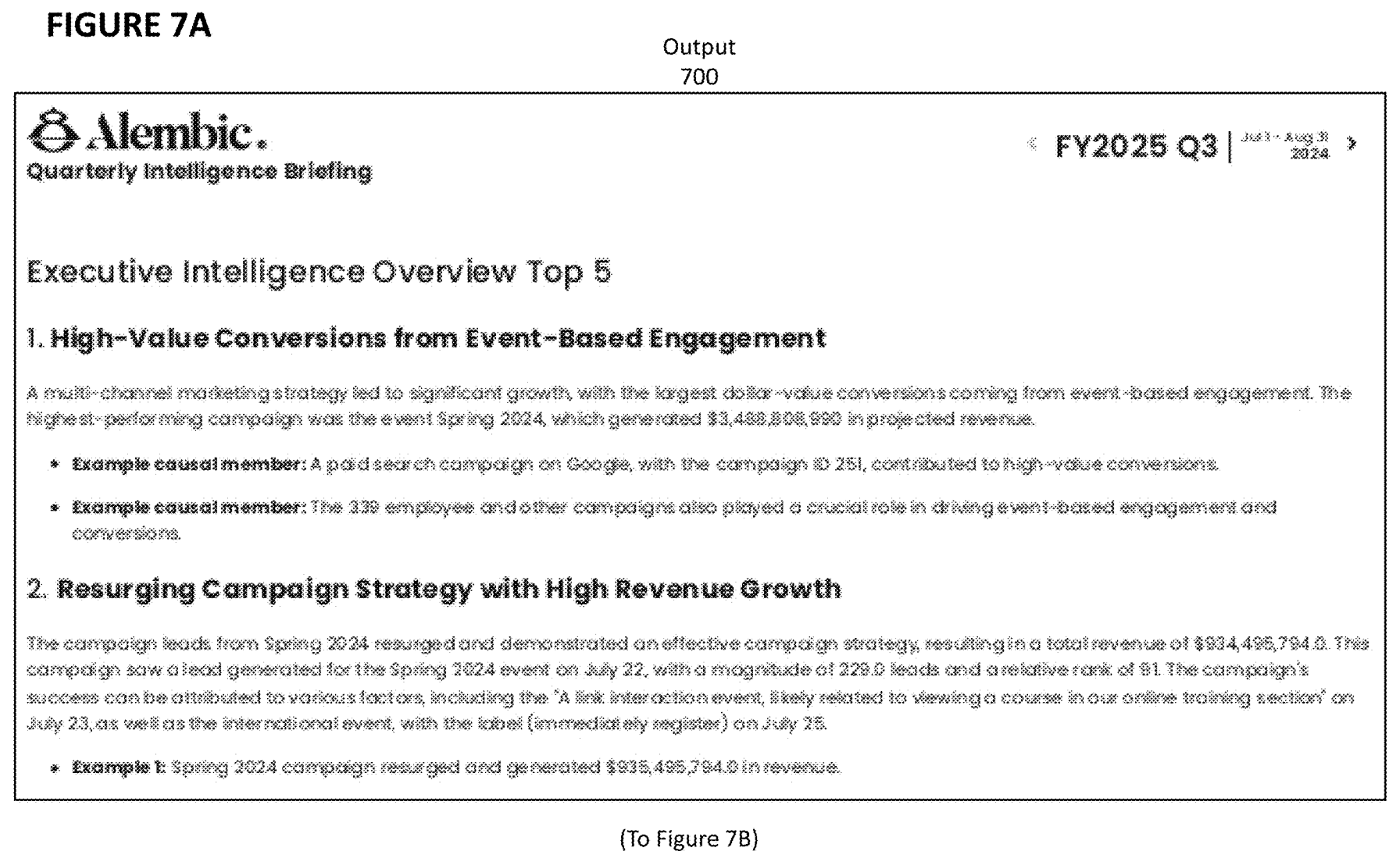

Output
700

FY2025 Q3 | Jul 1 – Aug 31 2024

Alembic.
Quarterly Intelligence Briefing

Executive Intelligence Overview Top 5

1. High-Value Conversions from Event-Based Engagement

A multi-channel marketing strategy led to significant growth, with the largest dollar-value conversions coming from event-based engagement. The highest-performing campaign was the event Spring 2024, which generated $3,498,808,899 in projected revenue.

- Example causal member: A paid search campaign on Google, with the campaign ID 251, contributed to high-value conversions.
- Example causal member: The 339 employees and other campaigns also played a crucial role in driving event-based engagement and conversions.

2. Resurging Campaign strategy with High Revenue Growth

The campaign leads from Spring 2024 resurged and demonstrated an effective campaign strategy, resulting in a total revenue of $934,495,794.0. This campaign saw a lead generated for the Spring 2024 event on July 22, with a magnitude of 229.0 leads and a relative rank of 91. The campaign's success can be attributed to various factors, including the 'A last interaction event', likely related to viewing a course in our online training section' on July 23, as well as the interactional event, with the label (immediately negative) on July 25.

- Example 1: Spring 2024 campaign resurged and generated $934,495,794.0 in revenue.

Figure 7B:
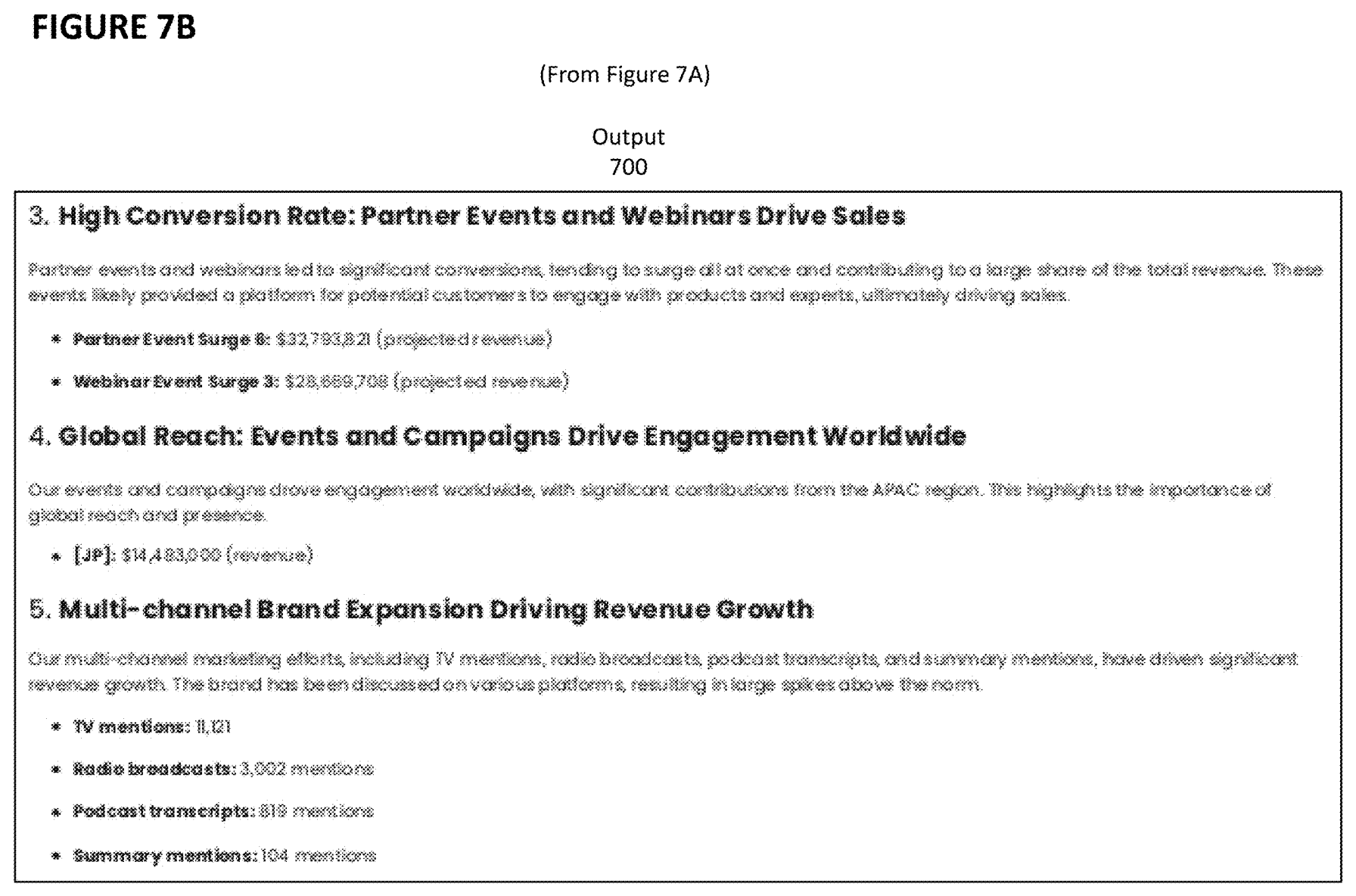

(From Figure 7A)

Output
700

3. High Conversion Rate: Partner Events and Webinars Drive Sales

Partner events and webinars led to significant conversions, tending to surge all at once and contributing to a large share of the total revenue. These events likely provided a platform for potential customers to engage with products and experts, ultimately driving sales.

* Partner Event Surge 8: $32,783.21 (projected revenue)
* Webinar Event Surge 3: $23,669,766 (projected revenue)

4. Global Reach: Events and Campaigns Drive Engagement Worldwide

Our events and campaigns drove engagement worldwide, with significant contributions from the APAC region. This highlights the importance of global reach and presence.

* [JP] $14,463,000 (revenue)

5. Multi-channel Brand Expansion Driving Revenue Growth

Our multi-channel marketing efforts, including TV mentions, radio broadcasts, podcast transcripts, and summary mentions, have driven significant revenue growth. The brand has been discussed on various platforms, resulting in large spike above the norm.

* TV mentions: 11,131
* Radio broadcasts: 3,002 mentions
* Podcast transcripts: 810 mentions
* Summary mentions: 104 mentions Method 800

(From Figure 8A)

Method
800

INTEGRATED CIRCUIT TO IMPLEMENT SPIKING NEURAL NETWORK

FIELD OF THE INVENTION

An integrated circuit and associated methods to implement a spiking neural network are disclosed.

BACKGROUND OF THE INVENTION

Artificial neural networks are increasingly used for a variety of tasks, including image recognition, natural language processing, and other forms of pattern analysis. However, conventional architectures—such as recurrent neural networks (RNNs) and convolutional neural networks (CNNs)—often exhibit limited efficacy when confronted with temporal variations, particularly at low frequencies or in sporadic bursts of activity. Moreover, these networks typically rely on offline retraining whenever data distributions shift, making them unwieldy and time-consuming to update in real-world scenarios.

Recent data environments frequently comprise multiple, discrete input streams, each with its own unique temporal behavior. Existing neural network methods tend to merge all data into a single model, losing the per-stream adaptability necessary for real-time detection and rapid evolutionary learning. Consequently, there is a need for improved neural network systems that can handle independent data streams while also inferring regular and causal relationships across them. Such an approach would capture high and low-frequency events, accommodate periods of inactivity, and permit the creation of an aggregate meta-network where each independent network contributes and responds to evolving causal dynamics. By adapting incrementally rather than requiring a full rebuild, such a system would dramatically reduce downtime, increase insights, and optimize computational resources.

SUMMARY OF THE INVENTION

An integrated circuit and associated methods for implementing a multi-level spiking neural network are disclosed. In one embodiment, each data stream is processed by an independent spiking neural network (SNN), with these individual networks collectively feeding into a Temporal Causal Entanglement Graph (TCEG). In this meta-network, nodes represent neurons from across the SNNs, and edges encode causal entanglements between neurons in different streams. A continual learning engine modifies the network structure in real time by adding or removing neurons and adapting the edges as new data arrives, while a mining engine identifies patterns that emerge from the aggregated network and presents them to a user.

By unifying multiple per-stream SNNs into a single, adaptive TCEG, the invention harnesses cross-stream causal interactions to reveal both short-term and long-term insights. This design allows the system to dynamically scale and refine its topology, capturing complex real-world phenomena across various data sources while providing an interpretable framework for understanding how individual neural activities influence each other over time.

BRIEF DESCRIPTION OF THE DRAWINGS

FIGS. 6A and 6B depict an example of an output.

FIGS. 7A and 7B depict an example of an output.

DETAILED DESCRIPTION OF THE INVENTION

Figure 1:
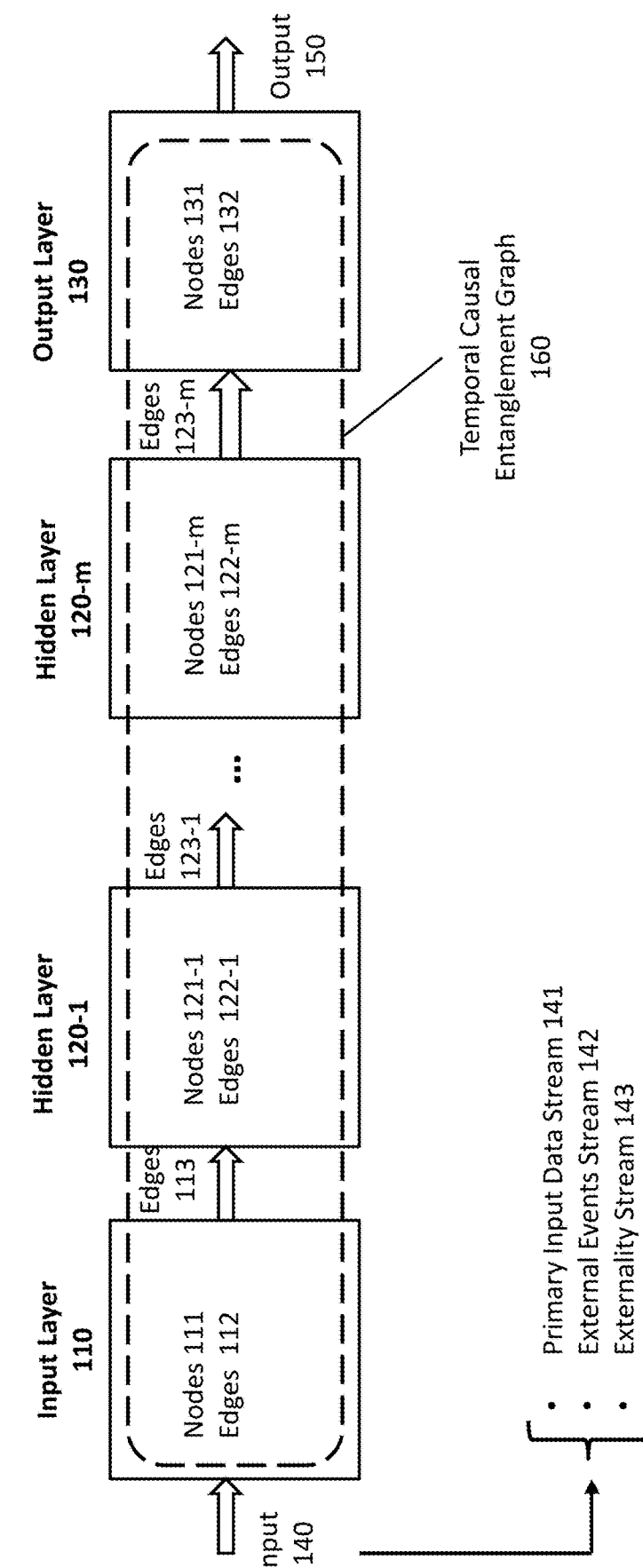
FIG. 1 depicts a spiking neural network.

FIG. 1 depicts an exemplary spiking neural network 100, comprising an input layer 110, a series of hidden layers 120-1 through 120-m (where m is the total number of hidden layers), and an output layer 130. In this embodiment, spiking neural network 100 is implemented within a Temporal Causal Entanglement Graph (TCEG) 160, wherein each node corresponds to a neuron in the spiking neural network and each edge represents a synapse. The edges in TCEG 160 encode directed causal entanglements among the neurons, allowing for a more comprehensive analysis of how different activations and pathways influence one another over time.

Input layer 110 comprises nodes 111 and edges 112, where nodes 111 are connected to one another by edges 112. Similarly, hidden layer 120-1 comprises nodes 121-1 and edges 122-1, where nodes 121-1 are connected to one another by edges 122-1; hidden layer 120-m comprises nodes 121-m and edges 122-m, where nodes 121-m are connected to one another by edges 122-m; and all intervening hidden layers between hidden layer 120-1 and hidden layer 120-m similarly contain nodes and edges. Output layer 130 comprises nodes 131 and edges 132, where nodes 131 are connected to one another by edges 132.

Nodes 111 in input layer 110 are connected to nodes 121-1 in hidden layer 120-1 by edges 113; nodes 121-1 in hidden layer 120-1 are connected to nodes in the next hidden layer by edges 123-1; all other intervening hidden layers are connected in a similar manner; nodes 121-m in hidden layer 120-m are connected to nodes 131 in output layer 130 by edges 123-m.

The nodes and edges of spiking neural network 100 form temporal casual entanglement graph 160, which is a data structure containing all nodes and edges of spiking neural network 100.

Input layer 110 receives input 140. Input 140 comprises one or more of the following types of data:

Primary input data stream 141, which comprises continuous time-series data optionally processed using Fisher-Rao metric—or another complex divergence measure—for encoding. Examples of such data include data from the web and third-party media.

External events stream 142, which comprises data representing discrete external events processed using specialized spike encoding. Examples include data from a series of dinners, a technical offsite, sports game, a big conference, and billboards over time.

Externality stream 143, which comprises discrete and continuous data from external sources about the state of the world outside of the events in primary input data stream 141. Examples include data regarding the weather, federal interest rates, and oil prices.

Output layer 130 generates output 150. Output 150 can be parsed and presented to a user of spiking neural network 100 and can include, for example, the identification of anomalies or chains of events in input 140 that may be of interest to the user. Examples of output 150 are discussed below with reference to FIGS. 6A, 6B, 7A, and 7B.

Each node in temporal causal entanglement graph 160 is a neuron in spiking neural network 100, and each edge in temporal causal entanglement graph 160 is a synapse in spiking neural network 100. The neurons communicate with spikes. Each neuron sends discrete signals (spikes) at specific times rather than signals that are continuous over time. The timing of these spikes is crucial, allowing spiking neural network 100 to naturally process sequences and temporal patterns. Each neuron remains inactive until it receives input. As a neuron receives input, its internal state builds up toward a firing threshold. Once the internal state crosses the threshold, the neuron spikes, sending a signal to one or more other neurons to which it is connected by edges. Edges represent connections or communication pathways between neurons and the influence that one neuron's activation has on another neuron. After firing, the neuron resets its internal state and waits for new input. Each neuron updates its connection strength with others (that is, the strength of the edges connected to other neurons) based on how often it spikes in sync with other neurons, which enables spiking neural network 100 to learn and recognize patterns. As discussed in greater detail below, the structure of spiking neural network 100 can be adapted over time by adding and removing neurons.

Figure 2:
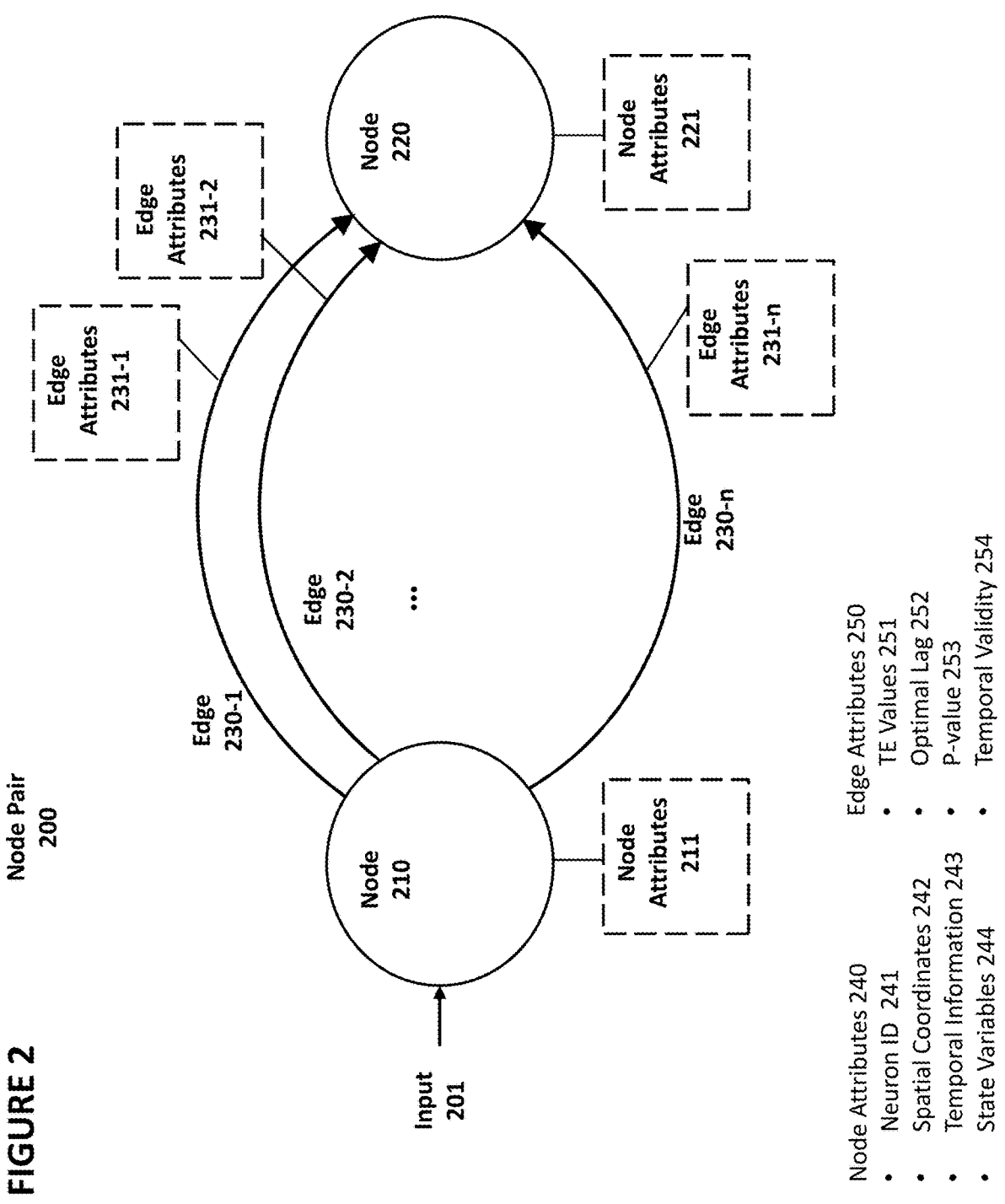
FIG. 2 depicts an exemplary node pair in the spiking neural network of FIG. 1.

FIG. 2 depicts node pair 200, which is an example of two nodes and a plurality of edges between those nodes in temporal causal entanglement graph 160 and spiking neural network 100 of FIG. 1. This example is illustrative of the relationship that can exist between any two nodes in spiking neural network 100, including nodes in different layers.

Node pair 200 comprises node 210 and node 220. Node 210 is associated with node attributes 211 and node 220 is associated with node attributes 221. Node 210 is connected to node 220 by edges 230-1, 230-2, . . . , 230-n, where n is the number of edges between nodes 210 and node 220. The value of n can change over time. Edge 230-1 is associated with edge attributes 231-1, edge 230-2 is associated with edge attributes 231-2, edge 230-n is associated with edge attributes 231-n, and all other edge are similarly associated with edge attributes.

Node attributes 211 and 221, as well as node attributes for all other nodes in spiking neural network 100, are instantiations of node attributes 240, which includes one or more of the following attributes:

Neuron ID 241: A unique identifier for the node;

Spatial Coordinates 242: The node's position in space, such as its layer and location within that layer;

Temporal Information 243: Creation, deletion, and activation times (e.g., timestamps) for the node;

State Variables 244: Variables for activation status (inactivated, activated, merged, or deleted), weights, thresholds, feature vectors, and other data.

The weights, thresholds, and feature vectors can be implemented in numerous different ways. In one embodiment, the weights comprise $\mu_i$ (the mean or center) and $\Sigma_i$ (the covariance or scale) of a data distribution represented by the neuron, where the data distribution in turn represents an event. These weights will lead to a Gaussian-like or elliptical shape of the data distribution, which can be accurate or representing certain types of real-world events. In another embodiment, the weights comprise $\theta_i$ (flow parameters, which can comprise weights, biases, and transformations of the nodes own internal neural network) which generally require more memory than $\mu_i$ and $\Sigma_i$ but are more accurate in their representation of events, particularly events that create data distributions that are multi-modal or have heavy tails. In this embodiment, normalizing-flow neurons are employed at the individual neuron level to capture complex, high-dimensional data distributions in real time. Unlike elliptical or Gaussian assumptions, normalizing-flow neurons utilize invertible transformations from a base distribution, enabling each neuron to adapt its internal parameters as new data arrives. This approach accommodates evolving, multi-modal, or otherwise non-Gaussian data with minimal loss of fidelity. Moreover, by integrating Fisher-Rao-based distance metrics, or another divergence measure, the system can dynamically spawn or merge neurons when distributional shifts occur, effectively balancing computational overhead against model accuracy. It can function via this long-term Fisher-Rao-based distance and/or the local distance. This design ensures that the spiking neural network efficiently scales in response to changing temporal patterns, without requiring a full network rebuild.

Edge attributes 231-1, 231-2, . . . , 231-n, as well as all other edge attributes for all other edges in spiking neural network 100, are instantiations of edge attributes 250, which includes one or more of the following attributes:

Transfer Entropy Values 251: Quantifications of causal influence between two nodes, which may change over time;

Optimal Lag 252: The temporal delay at which the strongest causal connection occurs.;

P-value 253: The statistical significance of a transfer entropy estimate; and Temporal Validity 254: The period (e.g., t10 to t20) during which the computed transfer entropy value remains valid, reflecting the dynamic nature of causal influences within the network.

In one illustrative example, node 210 receives input 201 from an unspecified upstream node (not shown). Initially, node 210 remains inactive until it detects input 201, at which point node 210 compares the input against a threshold stored within state variables 244 in node attributes 211. Upon determining that input 201 surpasses the threshold, node 210 spikes, effectively multiplying input 201 by a weight also stored within state variables 244 in node attributes 211. The resulting activation value is then propagated via edges 230-1, 230-2, . . . , 230-n to node 220, as well as any other nodes to which node 210 is connected. Node 220 subsequently subjects the incoming activation signals from edges 230-1, 230-2, . . . , 230-n to a similar threshold comparison (referencing its own state variables 244 in node attributes 221) to determine if and when node 220 should spike.

Figure 3:
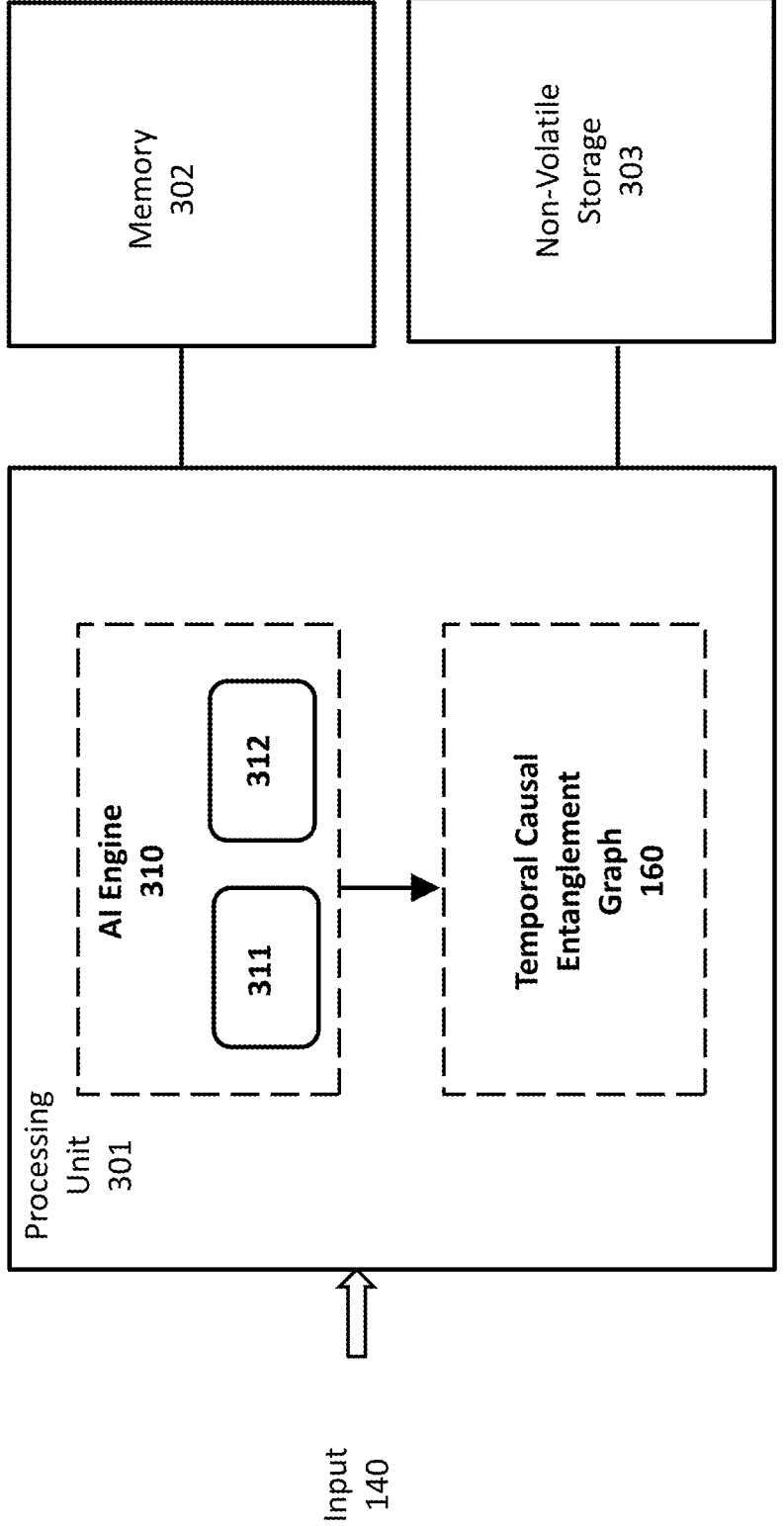
FIG. 3 depicts a computing system comprising a processing unit for building a temporal causal entanglement graph to implement the spiking neural network of FIG. 1.
Figure 4:
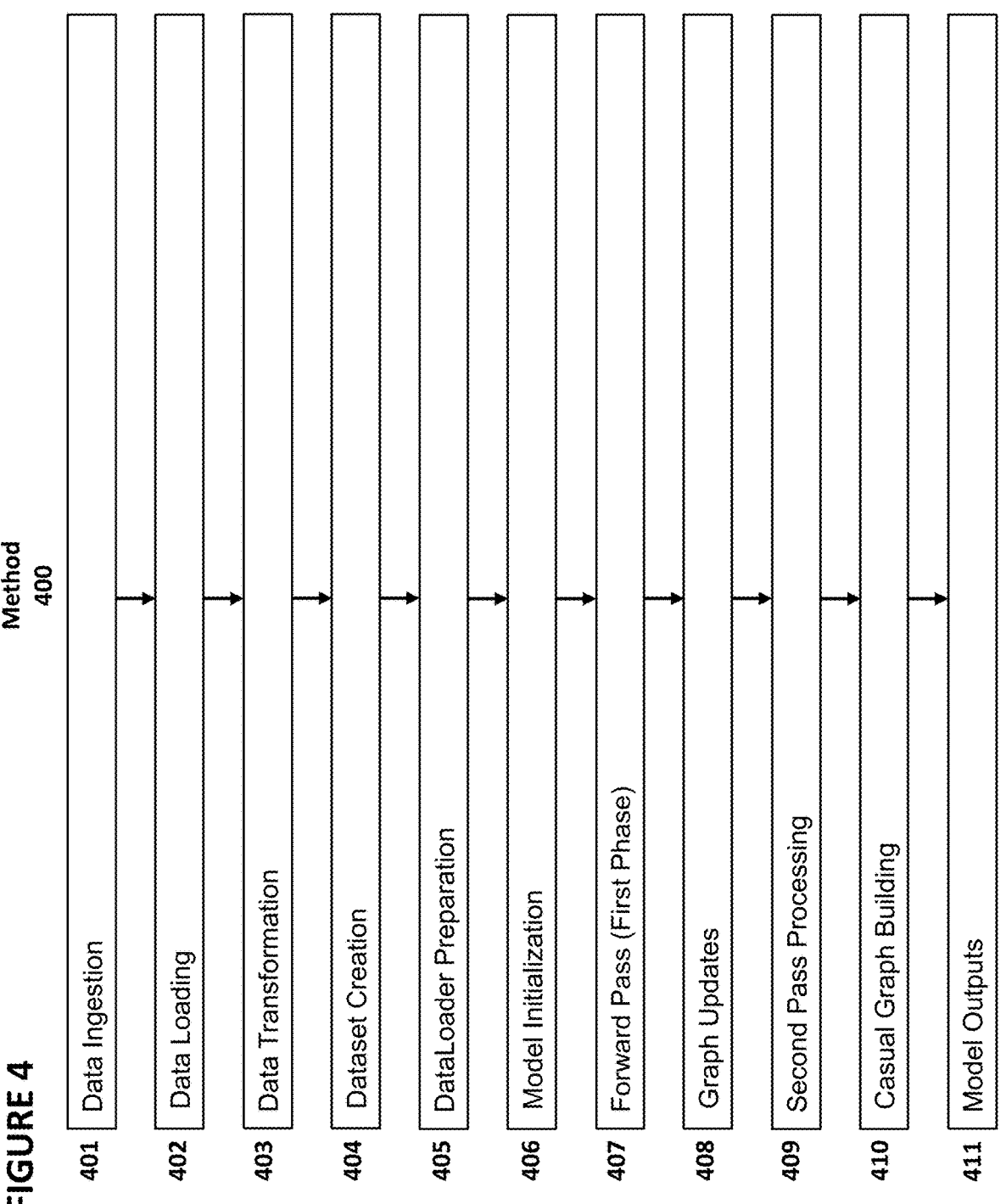
FIG. 4 depicts a method for building the spiking neural network of FIG. 1.

FIGS. 3 and 4 illustrate how temporal causal entanglement graph (TCEG) 160 is generated to implement spiking neural network 100, as shown in FIGS. 1 and 2. FIG. 3 depicts a computing system 300 that includes a processing unit 301, memory 302, and non-volatile storage 303. Processing unit 301 may incorporate one or more processing cores fabricated in an integrated circuit, optionally comprising both CPU and GPU resources. Memory 302, which can be DRAM, SRAM, or another type of volatile memory, and non-volatile storage 303 (e.g., a hard disk drive or solid-state drive) are interconnected with processing unit 301 through one or more interfaces. This computing system 300 is configured to construct and manage temporal causal entanglement graph 160, thereby enabling the real-time adaptation and execution of spiking neural network 100. In one embodiment, memory 302 and non-volatile storage 303 are external to processing unit 301. In another embodiment, memory 302 and non-volatile storage 303 are internal to processing unit 301 and optionally can be formed in the same integrated circuit as processing unit 301.

Processing unit 301 executes artificial intelligence (AI) engine 310. AI engine 310 comprises lines of software code stored in one or more of memory 302 and non-volatile storage 303 and executed by processing unit 301. AI engine 310 receives some or all of input 140 and generates temporal causal entanglement graph 160, which is then stored in one or more of memory 302 and non-volatile storage 303. Input 140 is a dynamic set of data obtained over time, and it is to be understood that at this stage a portion of input 140 might be used to create the initial version of temporal causal entanglement graph 160 and at later points in time, other portions of input 140 are used to modify temporal causal entanglement graph 160. AI engine 310 comprises continual learning engine 311 and mining engine 312. At any given time, temporal causal entanglement graph 160 can be stored in one or more of processing unit 301, memory 302, or non-volatile storage 303. It is to be understood that processing unit 301 optionally can include buffers, registers, cache systems, and other memory and non-volatile storage beyond what is shown in FIG. 3.

FIG. 4 depicts method 400 to generate temporal causal entanglement graph 160. Method 400 is performed by processing unit 301 executing AI engine 310.

Method 400 comprises the following steps:

Data Ingestion 401. In this step, data (which is a portion of input 140 in FIG. 1) is ingested into processing unit 301 from external databases, such as Druid or PostgreSQL.

Data Loading 402. In this phase, the system retrieves raw data (a subset of input 140 in FIG. 1) from external databases by issuing structured queries. Unlike the Data Ingestion step, which broadly acquires or streams data into the system, Data Loading focuses on collating and organizing that data into a GPU-compatible format—for instance, batching or tensorization—so that high-throughput processing can occur efficiently within processing unit 301.

Data Transformation 403. In this step, AI engine 310 converts the data that was ingested in step 401 and loaded in step 402 into a format suitable for modeling, such as PyTorch tensors. This includes extracting relevant fields (e.g., timestamps, metric values), handling data types and missing values.

Dataset Creation 404. In this step, AI engine 310 organizes the transformed data from step 403 into an iterable dataset.

Data Loader Preparation 405. In this step, AI engine 310 prepares data loaders to feed data into the model efficiently. This involves creating Data Loader instances with the datasets, defining custom collate functions if necessary, and setting batch sizes and number of worker threads.

Model Initialization 406. In this step, AI engine 310 optimizes temporal causal entanglement graph 160, including the creation of nodes, such as some or all of nodes 111, nodes 121-1, . . . , 121-*m*, and nodes 131 in FIG. 1.

Forward Pass (First Phase) 407. In this step, AI engine 310 processes input 140 and updates temporal causal entanglement graph 160. This step can include applying time encoding to timestamps (such as timestamps included in temporal information 243 in FIG. 2), generating embeddings using encoded inputs, detecting anomalies by computing reconstruction errors, identifying anomalies based on structural and statistical thresholds, and creating or updating neurons in temporal causal entanglement graph 160.

Graph Updates 408. In this step, AI engine 310 creates and updates neurons in temporal causal entanglement graph 160. AI engine 310 updates node attributes 240 in FIG. 2, such as activation times and intensities. Edges are added to temporal causal entanglement graph 160 and edge attributes 250 (e.g., weights, timestamps) are updated.

Second Pass Processing 409. In this step, AI engine 310 further refines temporal causal entanglement graph 160 by adding edges without creating new nodes. This involves collecting embeddings and neuron types, updating temporal causal entanglement graph 160 based on interactions, and calculating transfer entropy between neurons.

Causal Graph Building 410. In this step, AI engine 310 calculates transfer entropy to infer causal relationships between nodes, adds edges based on transfer entropy significance, updates edge attributes 250 (e.g., transfer entropy value, p-value), and removes expired edges based on temporal validity.

Model Outputs 411. In this step, AI engine 310 generates some or all of output 150. Possible outputs include providing anomaly scores for input 140, updating the temporal causal entanglement graph 160, and embeddings and neuron states for further analysis.

With reference again to FIG. 3, using continual learning engine 311, AI engine 310 balances learning new information and retaining important long-term patterns while maintaining computational efficiency through effective neuron merging. It also prevents catastrophic memory collapse over long periods.

Continual learning engine 311 performs the following functions and revises temporal causal entanglement graph 160 accordingly:

Metaplasticity: Continual learning engine 311 adjusts synaptic plasticity dynamically (such as by adjusting edge attributes 250) to protect important synapses while allowing others to remain plastic. Continual learning engine 311 protects long-term patterns from short-term fluctuations, allows dynamic adjustment at the synapse level, and enhances memory retention of seasonal and multi-year patterns.

Synaptic Consolidation: Continual learning engine 311 updates reference weights gradually for long-term memory retention (such as by adjusting edge attributes 250). Continual learning engine 311 gradually embeds seasonal and annual patterns, stabilizes important synaptic weights over time, and allows adjustment to yearly fluctuations. This results in the retention of long-term patterns, such as seasonal or multi-year trends.

Heterosynaptic Plasticity: Continual learning engine 311 regularizes synaptic weights by decaying them toward reference values (such as by adjusting edge attributes 250). Continual learning engine 311 regularizes synaptic weights by decaying them toward reference weights, preventing weight growth and maintaining stability, ensuring network stability and robustness against new data. Continual learning engine 311 prevents divergence of synaptic weights, supports retention of important patterns, and minimizes disruption from new learning.

Figures 5A, 5B:
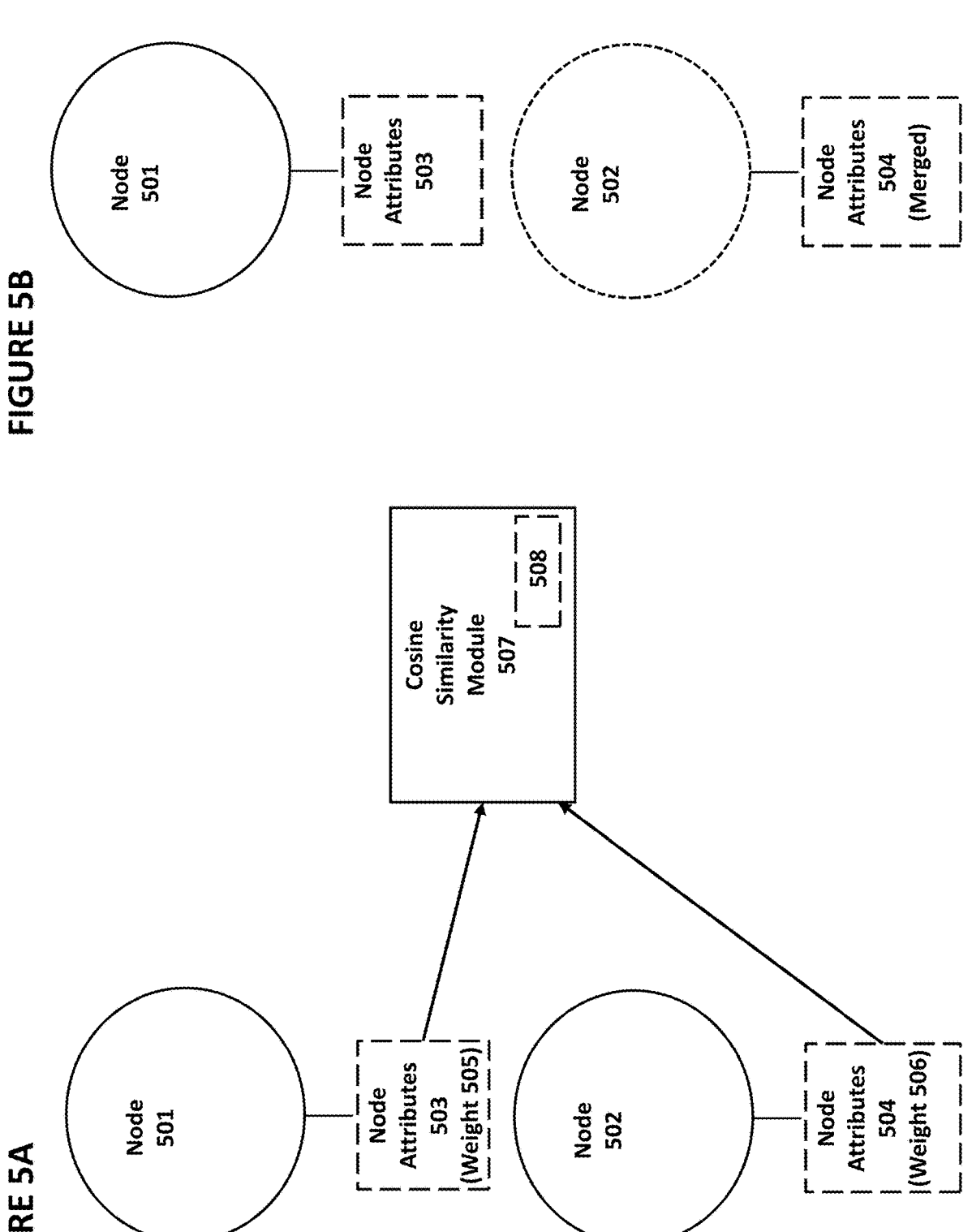
FIGS. 5A and 5B depict the merging of two nodes.

Neuron Merging Mechanism. Continual learning engine 311 combine neurons representing similar patterns to reduce redundancy and manage network size (such as by modifying state variables 244 in node attributes 240 of affected nodes by changing a node's state to merged or deleted). Continual learning engine 311 optionally can utilize reference weights for long-term patterns. Continual learning engine 311 optionally can combine neurons representing similar patterns using cosine similarity to reduce redundancy and prevent excessive growth in network size. This is shown in FIGS. 5A and 5B. FIG. 5A depicts node 501 associated with node attributes 503 and node 502 associated with node attributes 504. Node attributes 503 and 504 are instantiations of node attributes 240 in FIG. 2. Node attribute 503 comprises weight 505, and node attribute 504 comprises weight 506. Cosine similarity module 507, which is a module within AI engine 310 of FIG. 3, performs a function on weights 505 and 506 to determine if their similarity exceeds a similarity threshold 508. If yes, then nodes 501 and 502 are merged; if no, the nodes 501 and 502 are not merged. FIG. 5B depicts the situation where nodes 501 and 502 are merged. Node 501 is the same as in FIG. 5A, but the state of node 502 is now changed to merged. Node 502 is still maintained in the TCEG but is effectively ignored going forward. All edges that were connected to node 502 in FIG. 5A are now moved to node 501 instead.

State Variables 244: Variables for activation status (inactivated, activated, merged, or deleted), weights, thresholds, feature vectors, and other data.

With reference again to FIG. 3, mining engine 312 detects frequent subgraphs in temporal causal entanglement graph 160. Mining engine 312 can implement a set of rules to detect subgraphs of interest and optionally takes into account activation state of nodes. Mining engine 312 also can detect temporal evolution, meaning changes in temporal causal entanglement graph 160 over time. Mining engine 312 generates results that are provided as part of output 150 to the user.

FIGS. 6A and 6B depict output 600, which is an example of output 150 that can be generated for a user based on input 140. Output 150 provides practical information for the user regarding input 140.

FIGS. 7A and 7B depict output 700, which is another example of output 150 that can be generated for a user based on input 140. Output 150 provides practical information for the user regarding input 140.

Figure 8A:
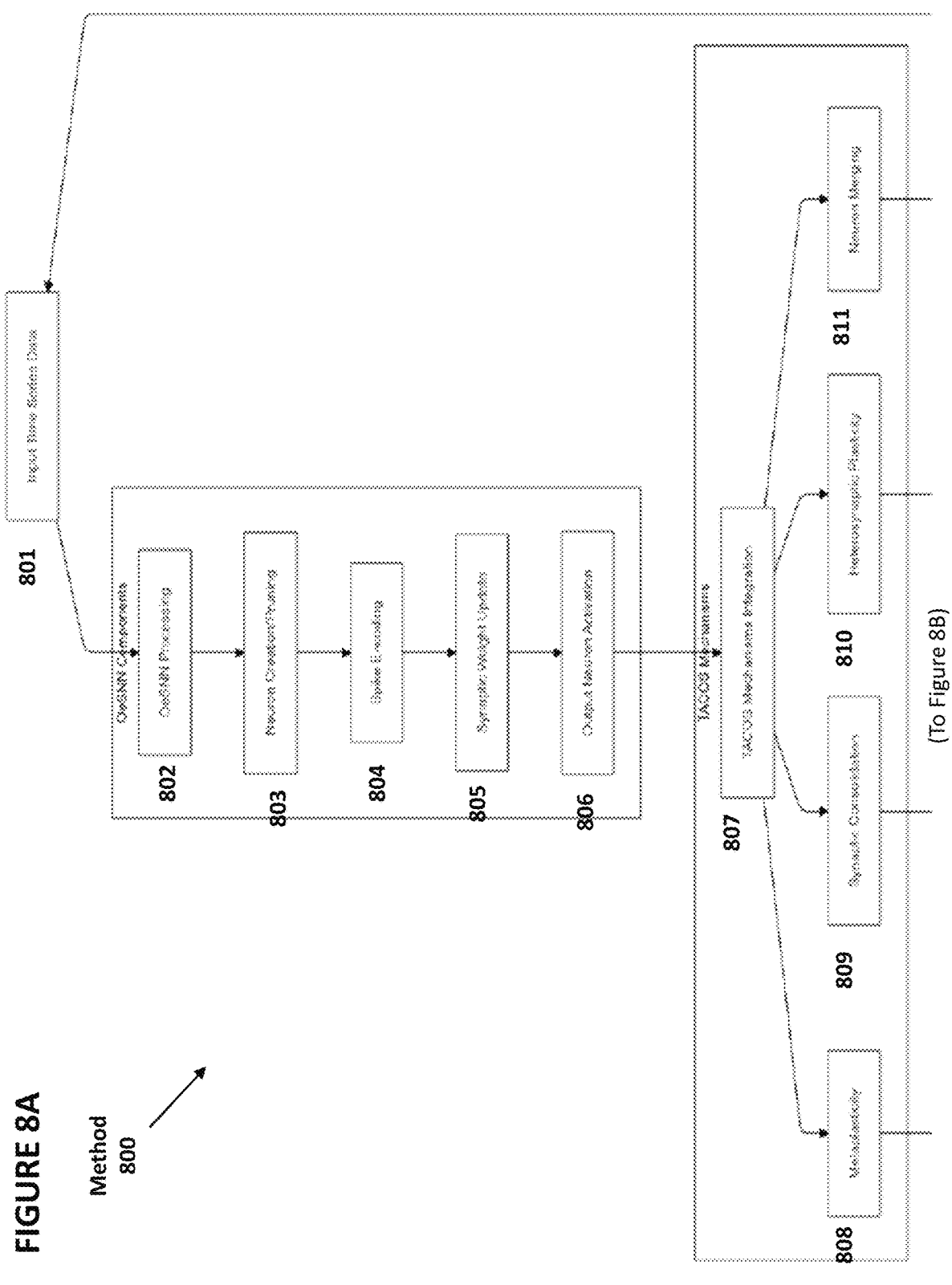
FIGS. 8A and 8B depict a method for building, improving, and using the spiking neural network of FIG. 1.
Figure 8B:
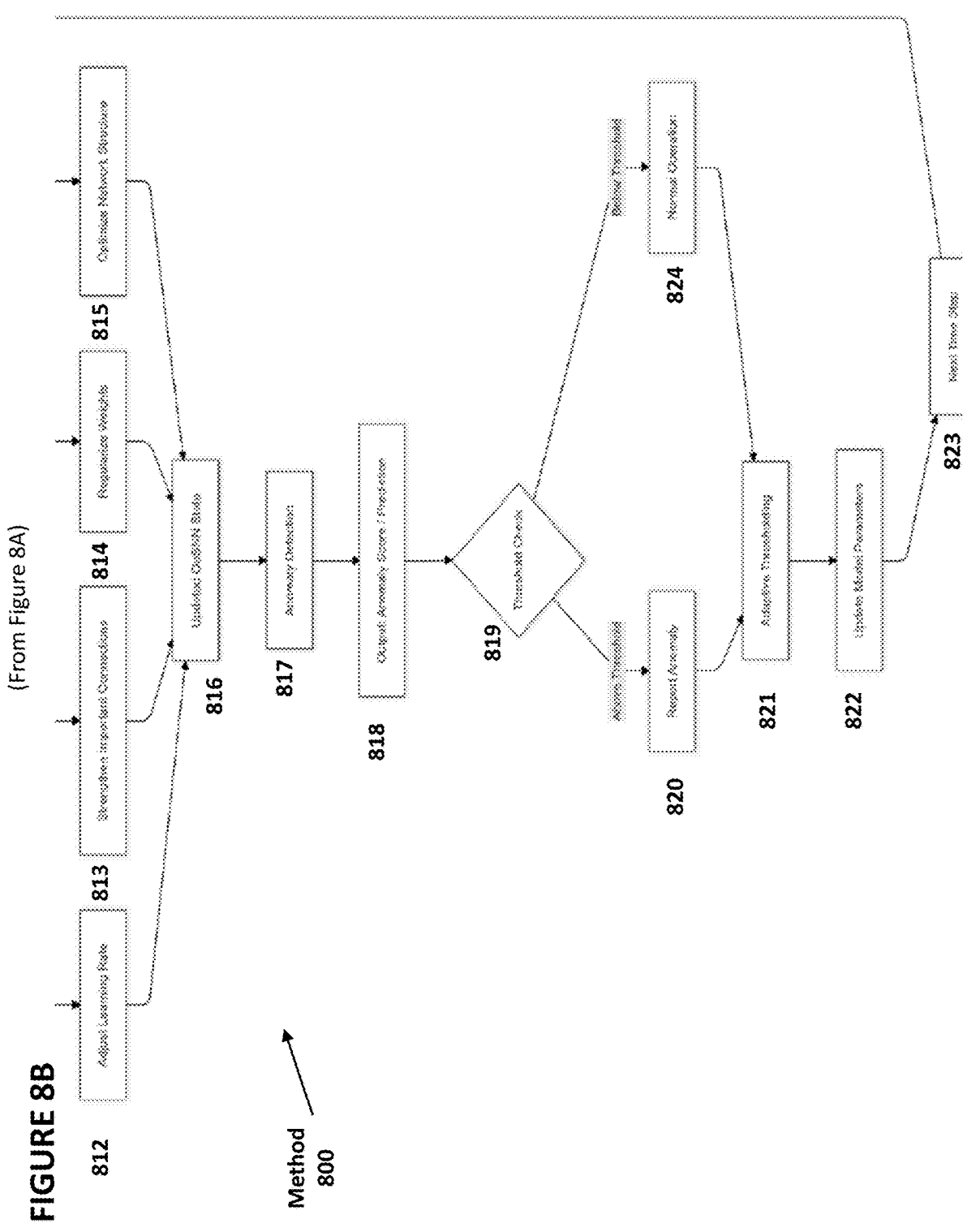

FIGS. 8A and 8B provides additional detail to the examples of FIGS. 1-4. FIGS. 8A and 8B depict method 800, which is a method performed by AI engine 310 for generating, modifying, and utilizing spiking neural network 100 and temporal causal entanglement graph 160.

Time series data is continually input into AI engine 310 (801). AI engine 310 performs processing (802), creates and prunes neurons (803), encodes spikes (804), updates synaptic weights (805), and outputs neuron activations (806). Continual learning engine 311 performs TACOS mechanisms integration (807), which includes metaplasticity adjustments (808) and adjusting learning rates (812); synaptic consolidation (809) and strengthening important connections (813), heterosynaptic plasticity adjustments (810) and regularizing weights (814); and neuron merging (811) and optimizing the network structure (815). Continual learning engine 311 updates the spiking neural network state (816). AI engine 310 performs anomaly detection (817), for which the output is an anomaly score or prediction (818). AI engine 310 performs a threshold check (819). If a value is above a threshold, an anomaly is reported (820) and adaptive thresholding is performed (821). If the value below the threshold, normal operation is presumed (824), and adaptive thresholding is performed (821). Model parameters are updated (822), and the next time step is performed (823), at which point additional time series data is input into AI engine 310 (801) and the steps of method 800 are repeated.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements there between.

What is claimed is:

1. An integrated circuit executing a temporal causal entanglement graph, the temporal causal entanglement graph comprising:

a plurality of nodes, each node is a normalizing-flow spiking neuron associated with node attributes, wherein the normalizing-flow spiking neuron utilizes invertible transformation from a base distribution to adapt the each node to the node attributes as new data arrives, and wherein the node attributes comprising temporal information; and a plurality of edges, each edge associated with edge attributes, wherein the edge attributes comprise temporal validity;

wherein each node in the plurality of nodes is connected to at least one other node in the plurality of nodes by one or more of the plurality of edges and wherein each edge indicates a causal entanglement between a first node and a second node connected to the edge, wherein a plurality of data streams is processed by a plurality of independent spiking neural network (SNN), wherein each data stream of the plurality of data streams is processed by an independent SNN of the plurality of independent SNN, and wherein the plurality of independent SNN is fed collectively into the temporal causal entanglement graph.

2. The integrated circuit of claim 1, wherein the temporal information comprises timestamps.

3. The integrated circuit of claim 1, wherein the node attributes further comprise a neuron ID, spatial coordinates, and state variables.

4. The integrated circuit of claim 3, wherein the state variables comprise an indicating of activation status.

5. The integrated circuit of claim 4, wherein activation status includes one of inactivated, activated, merged, or deleted.

6. The integrated circuit of claim 4, wherein the state variables further comprise weights, thresholds, and feature vectors.

7. The integrated circuit of claim 1, wherein the edge attributes comprise one or more of transfer entropy values, optimal lag, and p-values.

8. The integrated circuit of claim 1, wherein the integrated circuit executes an artificial intelligence engine.

9. The integrated circuit of claim 8, wherein the artificial intelligence engine comprises a continual learning engine.

10. The integrated circuit of claim 9, wherein the continual learning engine adjusts synaptic plasticity.

11. The integrated circuit of claim 9, wherein the continual learning engine consolidates synapses.

12. The integrated circuit of claim 9, wherein the continual learning engine regularizes synaptic weights.

13. The integrated circuit of claim 9, wherein the continual learning engine merges neurons.

14. The integrated circuit of claim 8, wherein the artificial intelligence engine comprises a mining engine.

15. A method of implementing a spiking neural network, the method comprising:

generating, by a processing unit executing an artificial intelligence engine, a temporal causal entanglement graph comprising:

a plurality of neurons, each neuron is a normalizing-flow spiking neuron associated with node attributes, wherein the normalizing-flow spiking neuron utilizes invertible transformation from a base distribution to adapt the each node to the node attributes as new data arrives, and wherein the node attributes comprising temporal information; and a plurality of synapses, each synapse associated with edge attributes, wherein the edge attributes comprise temporal validity;

wherein each neuron in the plurality of neurons is connected to at least one other neuron in the plurality of neurons by one or more of the plurality of synapses indicating a causal relationship between the neurons, wherein a plurality of data streams is processed by a plurality of independent spiking neural network (SNN), wherein each data stream of the plurality of data streams is processed by an independent SNN of the plurality of independent SNN, and wherein the plurality of independent SNN is fed collectively into the temporal causal entanglement graph.

16. The method of claim 15, wherein the temporal information comprises timestamps.

17. The method of claim 15, wherein the node attributes further comprise a neuron ID, spatial coordinates, and state variables.

18. The method of claim 17, wherein the state variables comprise an indicating of activation status.

19. The method of claim 18, wherein activation status includes one of inactivated, activated, merged, or deleted.

20. The method of claim 17, wherein the state variables further comprise weights, thresholds, and feature vectors.

21. The method of claim 15, wherein the edge attributes comprise one or more of transfer entropy values, optimal lag, and p-values.

22. The method of claim 15, further comprising: adjusting synaptic plasticity.

23. The method of claim 15, further comprising: consolidating synapses.

24. The method of claim 15, further comprising: regularizing synaptic weights.

25. The method of claim 15, further comprising: merging neurons.

\* \* \* \* \*